(12) United States Patent
Schick

(10) Patent No.: US 11,009,968 B1
(45) Date of Patent: May 18, 2021

(54) BI-DIRECTIONAL TAP COMMUNICATION DEVICE

(71) Applicant: TAP SYSTEMS INC., Los Angeles, CA (US)

(72) Inventor: David B. Schick, Los Angeles, CA (US)

(73) Assignee: Tap Systems Inc., Los Angeles, CA (US)

(*) Notice: Subject to any disclaimer, the term of this patent is extended or adjusted under 35 U.S.C. 154(b) by 0 days.

(21) Appl. No.: 15/921,954

(22) Filed: Mar. 15, 2018

Related U.S. Application Data

(60) Provisional application No. 62/478,225, filed on Mar. 29, 2017.

(51) Int. Cl.
*G06F 3/023* (2006.01)
*G06F 3/01* (2006.01)

(52) U.S. Cl.
CPC .......... *G06F 3/0234* (2013.01); *G06F 3/014* (2013.01); *G06F 3/016* (2013.01)

(58) Field of Classification Search
CPC ...... G06F 3/0235; G06F 3/014; G06F 3/0346; G06F 3/023; G06F 3/00; G06F 3/0219; G06F 3/0304; G06F 3/0426; G06F 3/0425; G06F 1/163; G06F 3/0234; G06F 3/0233; G06K 9/00335; G06K 7/10396; G06K 2007/10534; G06K 2007/10891
See application file for complete search history.

(56) References Cited

U.S. PATENT DOCUMENTS

| 3,022,878 A | 2/1962 | Seibel et al. |
| 5,281,966 A | 1/1994 | Walsh |
| 6,380,923 B1 | 4/2002 | Fukumoto et al. |
| 2002/0009972 A1 | 1/2002 | Amento et al. |
| 2004/0263473 A1 | 12/2004 | Cho et al. |
| 2009/0005699 A1 | 1/2009 | Sakurai et al. |
| 2009/0326406 A1 | 12/2009 | Tan et al. |
| 2010/0134327 A1* | 6/2010 | Dinh .................. G06F 3/017 341/20 |
| 2014/0098018 A1 | 4/2014 | Kim et al. |
| 2014/0134575 A1* | 5/2014 | Kim .................. G09B 21/025 434/114 |
| 2014/0258864 A1 | 9/2014 | Shenoy et al. |
| 2014/0340298 A1* | 11/2014 | Aldossary .......... G06F 3/014 345/156 |
| 2015/0310762 A1* | 10/2015 | Seim .................. G09B 15/00 434/113 |
| 2015/0370326 A1 | 12/2015 | Chapeskie et al. |

(Continued)

FOREIGN PATENT DOCUMENTS

CN 103 995 621 A 8/2014

OTHER PUBLICATIONS

Int'l Search Report and Written Opinion issued in connection with Int'l Appl'n No. PCT/US2016/020048 dated May 24, 2016 (12 pages).

(Continued)

*Primary Examiner* — Nitin Patel
(74) *Attorney, Agent, or Firm* — Venable LLP

(57) ABSTRACT

Data receiving systems, methods and computer products are provided that include actuators in mechanical communication with fingers. Each of the actuators is arranged to apply a mechanical stimulus to a respective finger.

12 Claims, 11 Drawing Sheets

(56) References Cited

U.S. PATENT DOCUMENTS

2016/0124524 A1  5/2016  Zhao et al.
2018/0307313 A1* 10/2018  Belomoev ............... G06F 3/014

OTHER PUBLICATIONS

C.K. Sunith, "Virtual Keyboards Typing Out of Thin Air", Electronics for You, Apr. 2003, pp. 38-39.

C. Mehring et al., "KITTY: Keyboard Independent Touch Typing in VR", Virtual Reality, 2004. Proceedings. IEEE, Mar. 27-31, 2004, pp. 243-244.

Coroflot, Optical Keyboard Keyset, www.coroflot.com/erikcampbell/Optical-Keyboard-Keyset (last visited Jul. 12, 2016).

MicroSoft, Microwriter, research.microsoft.com/en-us/um/people/bibuxton/buxtoncollection/detail.aspx?id=5 (last visited Jul. 12, 2016).

Cykey homepage, www.cykey.co.uk/ (last visited Jul. 12, 2016).

MicroSoft, Chord Keyboard, research.microsoft.com/en-us/um/people/bibuxton/buxtoncollection/type.aspx?t=Chord%20Keyboard (last visited Jul. 12, 2016).

"TipTapSpeech now for the iPhone and iPad", valerielandau.wordpress.com/2010/04/03/tiptapspeech-now-for-the-phone-and-ipad/ (last visited Jul. 12, 2016).

"Father of the Keyset", dougengelbart.org/firsts/keyset.html (last visited Jul. 12, 2016).

"PMD and Infineon to enable tiny integrated 3D depth cameras (hands-on)", www.engadget.com/2013/06/06/pmd-infineon-camboard-pico-s-3d-depth-camera/ (last visited Jul. 26, 2016).

"The Virtual Keyboard may soon be a reality", phys.org/news/2014-05-virtual-keyboard-reality-video.html (last visited Jan. 26, 2016).

"Tiki'Labs virtual keyboard for iPhone takes shot at Swype, on-handed typing wars commence", Paul Miller, Dec. 18, 2009, www.engadget.com/2009/12/18/tikilabs-virtual-keyboard-for-iphone-takes-shot-at-swype-one-h/ (last visited Jul. 12, 2016).

"Motion-sensing Devices in the Assistive Technology Arena"—lecture slides, Owen R. Edwards, Jan. 22, 2010, web.stanford.edu/class/engr110/2010/lecture03b.html (last accessed Aug. 19, 2016).

"WearaBraille", Joshua Miele, www.ski.org/project/wearabraille (last accessed Aug. 10, 2016).

"WearaBraille, a virtual wireless Braille keyboard, with an iPhone and VoiceOver", Joshua Miele & Owen Edwards, National Rehabilitation Information Center, 2011, www.naric.com/?q=en/content/wearabraille-virtual-wireless-braille-keyboard-iphone-and-voiceover (last accessed May 31, 2017).

"WearaBraille, a virtual wireless Braille keyboard, with an Android phone", Joshua Miele, YouTube, Mar. 23, 2011, www.youtube.com/watch?v=oKj6BRCauOM (last accessed May 31, 2017).

* cited by examiner

100

801

802

BI-DIRECTIONAL TAP COMMUNICATION DEVICE

BACKGROUND

Field

Example aspects described herein related generally to chorded data entry systems, and more particularly to a bi-directional arbitrary surface and finger position keyboard.

Description of Related Art

Even before the invention of the typewriter in 1868, efforts have been made to use finger combinations in a "chorded" arrangement to enter alphanumeric information. FIG. 1 shows an example of a Baudot Keyboard 100, the earliest five key chorded arrangement, which was invented in 1870 by Jean-Maurice-Emile Baudot as a five key alphanumeric entry system for telegraph operators. Using only five keys, the operator could enter 32 unique 'codes', which were mapped to corresponding alphanumeric symbols. Such codes were sometimes referred to as Baudot Codes, the precursor of ASCII codes and the source of the term "baud."

Other common examples of chorded keyboards are stenographic keyboards, which typically include 22 keys, and Braille keyboards, which typically include six or eight keys.

With the advent of computers, a number of attempts have been made to use chorded keyboards (sometimes referred to as "keyers") for single-handed data entry.

Touch screens have allowed "soft" keyboards to be incorporated into mobile devices. In addition to standard alphanumeric keyboards, a number of attempts have been made to create chorded keyboards using touch screen systems. While the above devices provide one-handed methods for character entry, they all require that the operator contact a specific point, or set of points, with a specific finger, or set of fingers. This "aiming" requirement significantly reduces the speed and ease with which data can be entered.

A different strategy is employed by gesture-based systems, which enable an operator to enter data (and "point") on a computer or mobile device without employing a standard keyboard. In this context, a gesture is a motion, sensed by a computer, whereby a user moves a hand or finger from a starting point to an end point.

While gesture-based systems enable a user to enter characters without having to aim for a specific point, typically they require that the motion have a trajectory from a certain starting point to a certain ending point. Thus, to create a gesture, the user must necessarily travel a minimum distance from one point to another. This is unlike a typical physical keyboard, where the only data that must be derived is based on which key is pressed. Because of this, gesture-based systems are significantly slower than physical keyboards.

SUMMARY

In accordance with example aspects herein, the foregoing shortcomings are overcome by a novel, one-handed, chorded data entry system that enables an operator to tap a combination of fingers on a surface, thereby causing a character to be entered in an electronic device. The system allows the operator to tap on any surface, with the fingers arranged in any position. Neither the fingers nor the fingertips of the operator need be aimed at any target. As a result, the system described herein reduces finger travel and facilitates much faster and more accurate data entry than the prior systems.

In one embodiment, a data entry system includes a sensor apparatus arranged to generate a signal representative of a contact of one or more fingers singly or in combination against an arbitrary surface. The arbitrary surface does not generate the signal.

The contact of one or more fingers may represent a finger combination that maps to any one of a character and a command, or a combination of both the character and the command.

The data entry system can also include a wearable structure constructed to support the sensor apparatus on any one of i) a dorsal surface of a hand ii) a palmar surface of a hand, iii) a wrist, and iv) phalanges of a hand, or any combination of i), ii), iii) and iv).

In another embodiment, the data entry system further includes a memory. and the sensor apparatus further includes an image sensor arranged to acquire the signal, the signal being an image of the one or more fingers. The memory is operable to store the image.

The data entry system may also include a processor, communicatively coupled to the sensor apparatus, operable to filter the image to ascertain a location of each finger at the moment of contact against the arbitrary surface.

In yet another embodiment, the sensor apparatus further includes at least one mechanical sensor arranged to acquire the signal, the signal corresponding to a mechanical quantity caused by the one or more fingers contacting the arbitrary surface.

The data entry system may also include a processor operable to collect the signal received from the sensor apparatus at the moment of the contact against the surface.

A data entry method is also provided including the steps of generating a signal representative of a contact of one or more fingers singly or in combination against an arbitrary surface. The arbitrary surface does not generate the signal.

The data entry method can also include mapping a finger combination that is represented by the contact of the one or more fingers represents to any one of a character and a command, or a combination of both the character and the command.

In one embodiment, the data entry method can also include acquiring the image signal by an image sensor, the signal being an image of the one or more fingers, and storing the image in a memory.

The data entry method may also perform filtering the image to ascertain a location of each finger at the moment of contact against the arbitrary surface.

In yet another embodiment, the data entry method can include acquiring the signal, by at least one mechanical sensor, the signal corresponding to a mechanical quantity caused by the one or more fingers contacting the arbitrary surface.

The data entry method may further include collecting the signal received from the sensor apparatus at the moment of the contact against the surface.

In yet another aspect, a non-transitory computer readable storage medium storing a computer program which when executed by a computer causes the computer to execute a method of data entry according to the methods described herein In another embodiment, a data receiving system is provided. The system includes a plurality of actuators in mechanical communication with a plurality of fingers, each of the plurality of actuators arranged to apply a mechanical stimulus to a respective one of the plurality of fingers.

In one embodiment, the mechanical stimulus of the plurality of actuators maps to at least one of an alphanumeric character, a word, a phrase, and a sentence.

The data receiving system can also include a wearable structure constructed to support the plurality of actuators on a plurality of phalanges of a hand.

In yet another embodiment, the data receiving system includes a memory, a receiver operable to receive data, a decoder, communicatively coupled to the receiver, operable to decode the data into one or more tap codes; and a processor, communicatively coupled to the decoder, operable to actuate each of the plurality of actuators according to the tap codes.

A data receiving method is also provided. The method performs the steps of applying a mechanical stimulus to a plurality of fingers using a plurality of actuators in mechanical communication with respective ones of the plurality of fingers.

In another embodiment, the data receiving method includes the step of mapping the mechanical stimulus of the plurality of actuators maps to at least one of an alphanumeric character, a word, a phrase, and a sentence.

In yet another embodiment, the data receiving method includes the step of supporting the plurality of actuators on a plurality of phalanges of a hand using a wearable structure.

Another embodiment of the data receiving method includes the steps of receiving data; decoding the data into one or more tap codes; and actuating each of the plurality of actuators according to the tap codes.

Further features and advantages, as well as the structure and operation, of various example embodiments of the present invention are described in detail below with reference to the accompanying drawings.

BRIEF DESCRIPTION OF THE DRAWINGS

The features and advantages of the example embodiments presented herein will become more apparent from the detailed description set forth below when taken in conjunction with the drawings.

DETAILED DESCRIPTION

The example embodiments of the invention presented herein are directed to methods, systems and computer program products for a chorded data entry system that enables an operator to tap a combination of fingers on an arbitrary surface thereby causing a character or command to be entered in an electronic device, which are now described herein in terms of example one-handed chorded data entry systems. This description is not intended to limit the application of the example embodiments presented herein to one-handed use cases. In fact, after reading the following description it will be apparent to one skilled in the relevant art(s) how to implement all of the following example embodiments using a pair of the chorded data entry systems for use with an operator's left hand, right hand, or a combination of both. In addition, the term "finger combination" as used herein refers to any one finger or a combination of fingers.

The example chorded data systems described herein allow an operator's fingers to be arranged in any position and neither the fingers nor their fingertips need be aimed at any particular target. As a result, the system reduces finger travel and facilitates fast and accurate data entry. In addition, the system enables a user to enter characters or commands into a computing device by tapping a combination of fingers on any surface.

Figure 1:
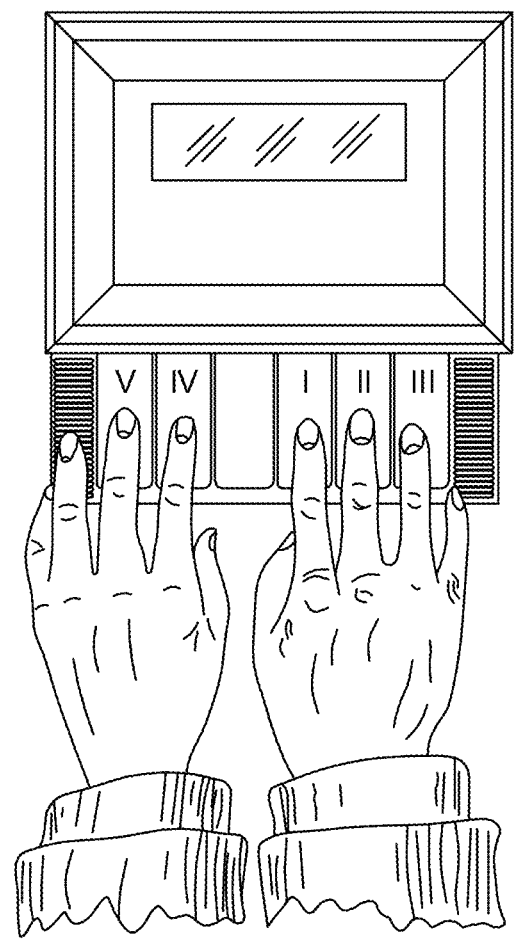
FIG. 1 illustrates an example of a Baudot Keyboard.
Figure 2:
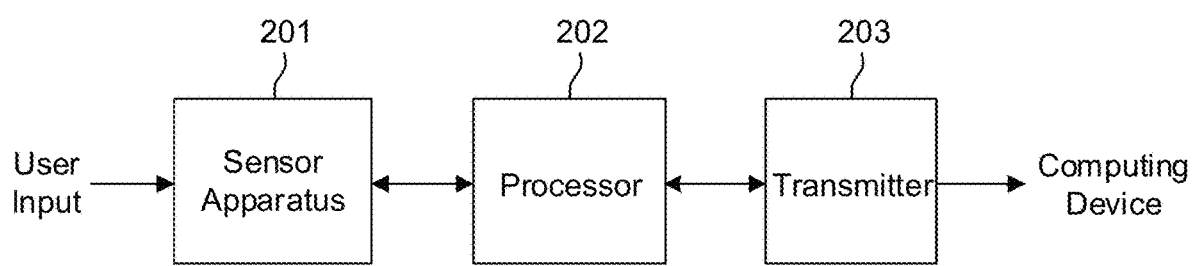
FIG. 2 illustrates an example system that may be employed in accordance with various example aspects herein.

FIG. 2 illustrates an example system 200 that may be employed in accordance with various example aspects. System 200 includes a sensor apparatus 201 that is coupled to a processor 202 which in turn is coupled to a transmitter 203.

In some example implementations sensor apparatus 201 operates as does a camera to the extent it can detect and convey information that constitutes an image of an object. In this implementation, the objects are fingers of a hand and a surface that the fingertips or substantially the fingertips of the fingers contact. Sensor apparatus is arranged to have the fingers in its field of view. Accordingly, the sensor apparatus 201 may be considered a special purpose camera or a camera that has been purposed and arranged for the particular applications described herein. For simplicity, in this embodiment the terms "sensor apparatus 201" and "special purpose camera" may be used interchangeably herein.

Particularly, sensor apparatus 201 may be integrated into a wearable structure such that the sensor apparatus 201 is located at the bottom of a wrist or palm of a user (also commonly referred to as the dorsal surface of a hand or palmar surface of a hand, respectively). In this embodiment, sensor apparatus 201 is arranged in a manner that allows all of the fingertips of the user to be within its field of view. The other components of system 200 including the processor 202 and transmitter 203 can be located elsewhere or inside on the housing or structure supporting the sensor apparatus 201.

In one embodiment, as sensor apparatus 201 captures finger combinations being used with each tap, processor 202 performs instructions which cause the sensed finger combination to be mapped to an appropriate character or command. The transmitter 203 then transmits the mapped or decoded character to a computing device via a wireless or wired interface.

Instead of determining finger combinations within system 200 by processor 202, in an alternative embodiment, processor 202 causes the image data obtained from the sensor apparatus 201 to be transmitted to the computing device for further processing (i.e., to process and filter the images, determine sensed finger combinations and map the sensed finger combinations to the appropriate character) via a wireless or wired interface. This would allow, for example, for the processing device of the computing device (e.g., in a smartphone or other computing device) to determine which fingertips were in contact with a surface during the tap, and which were not. Such an arrangement can reduce the complexity and power requirement of processor 202.

In yet another alternative embodiment, processor 202 performs some processing on the captured finger combinations, such as by performing edge detection filtering and landmark identification from the image data acquired by the sensor apparatus 201, and then forwarding the partially processed data through the transmitter to the computing device via a wireless or wired interface for further processing by the computing device and identification of the tapped finger combination.

The sensor apparatus 201 need only detect which fingers are in contact with the surface at the time of the tap, thereby allowing the user to tap on any surface, with fingers arranged in any position. The user need not aim at a specific key or location, or start the tap from a specific point (unlike in a gesture-based system), thus making the data entry process fast and reliable. Also, system 200 is mobile because tapping can be done on any surface, such as a table, a leg of the user, a chair, and/or the like.

Sensor apparatus 201 may optionally include a module, such as a mechanical sensor (e.g. accelerometers, vibration sensors, tactile sensors, force sensors, pressure sensors, gyroscopes, and the like; not shown), for sensing when a tap occurs (i.e. when any of the fingers of the hand have generated an acceleration, vibration, pressure or force indicative that they have made contact with a surface). In an example embodiment, processor 202 senses that a tap has occurred by reading the mechanical sensor, at which point the sensor apparatus 201 captures an image (or a series of images), and the processor 202 determines which fingertips were in contact with a surface during the tap, and which were not. The optional mechanical sensor can be located within the same housing as the sensor apparatus 201.

In an example embodiment of this optional arrangement, system 200 monitors the outputs of the mechanical sensor to determine that whether a tap (e.g., a contact of a finger with a surface) has occurred. The beginning of a tap event, in this situation, is indicated by a change in output from one or more mechanical sensor above a predetermined threshold. Once a tap is sensed, processor 202 causes an image sensor (discussed in more detail below) to capture image(s). In this embodiment, the mechanical sensor can be located anywhere on the hand or wrist that allows the mechanical sensor to sense mechanical quantities of any of the fingers used for tapping. For example, the mechanical sensor can be arranged to be located on the back of the wrist or hand, the palm, or on, for example, the proximal phalanges. Upon sensing a contact with a surface (i.e., a tap), the mechanical sensor generates mechanical quantities in the form of a signal capable of being processed (e.g., compared against a threshold) by processor 202.

Figure 3:
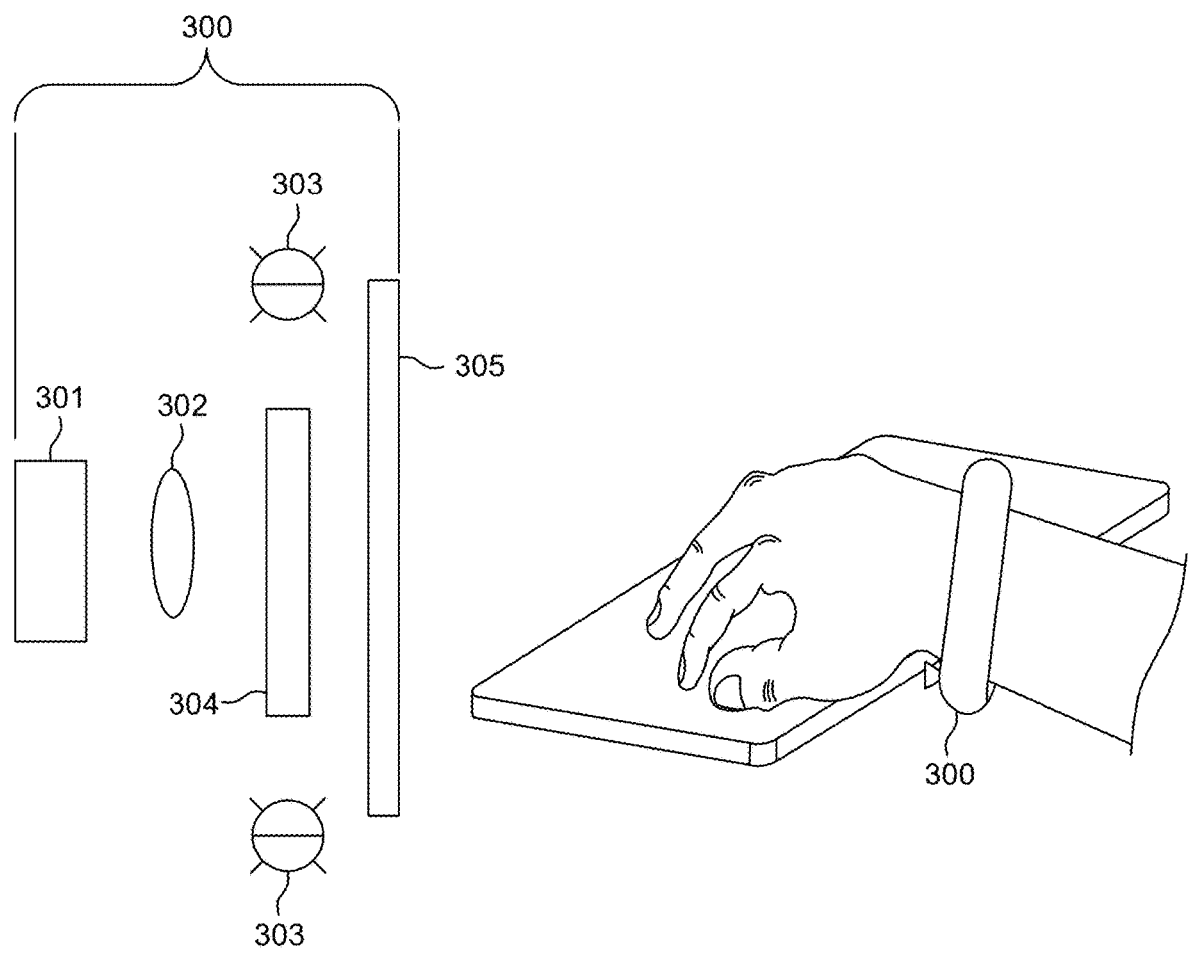
FIG. 3 illustrates an example of a camera-based sensor apparatus.

FIG. 3 illustrates an example camera-based sensor apparatus 300, or special purpose camera, which, in some example embodiments may further represent the sensor apparatus 201 that is described above in connection with FIG. 2. In one embodiment, sensor apparatus 300 includes an image sensor 301 which is sensitive to light in the near infrared spectrum, with associated drive electronics and image processing means (not shown), and a wide angle lens 302 arranged such that all five fingers are in its field of view. The image sensor 301 generates a signal representative of the image it captures.

Sensor apparatus 300 can also include an optical illumination system including one or more infrared light emitting diodes (IR LEDs) 303 which are strobed. In one embodiment, IR LEDs 303 are strobed in synchronization with the image sensor 301 or are illuminated whenever the device is turned on. In another embodiment IR LEDs 303 are strobed when a tap is detected.

An optical filter 304 is situated in front of image sensor 301 to prevent light having wavelengths that are below the infrared spectrum (e.g. 800 nm) from impinging on image sensor 301. Sensor apparatus 300 may also include a polarizing filter 305 placed in front of the IR LEDs 303 and lens 302, thus reducing the amount of ambient light that reaches the image sensor 301.

In this example implementation, as shown in FIG. 3, sensor apparatus 300 is implemented by attaching at least the sensor apparatus 300 to the bottom of a wrist of a user, arranged in a manner such that all of the fingertips of the user are within its field of view. As noted above in connection with FIG. 2, sensor apparatus 300 also can be implemented at other locations, such as by locating the sensor apparatus 300 at the bottom of a palm of a user.

Figure 4:
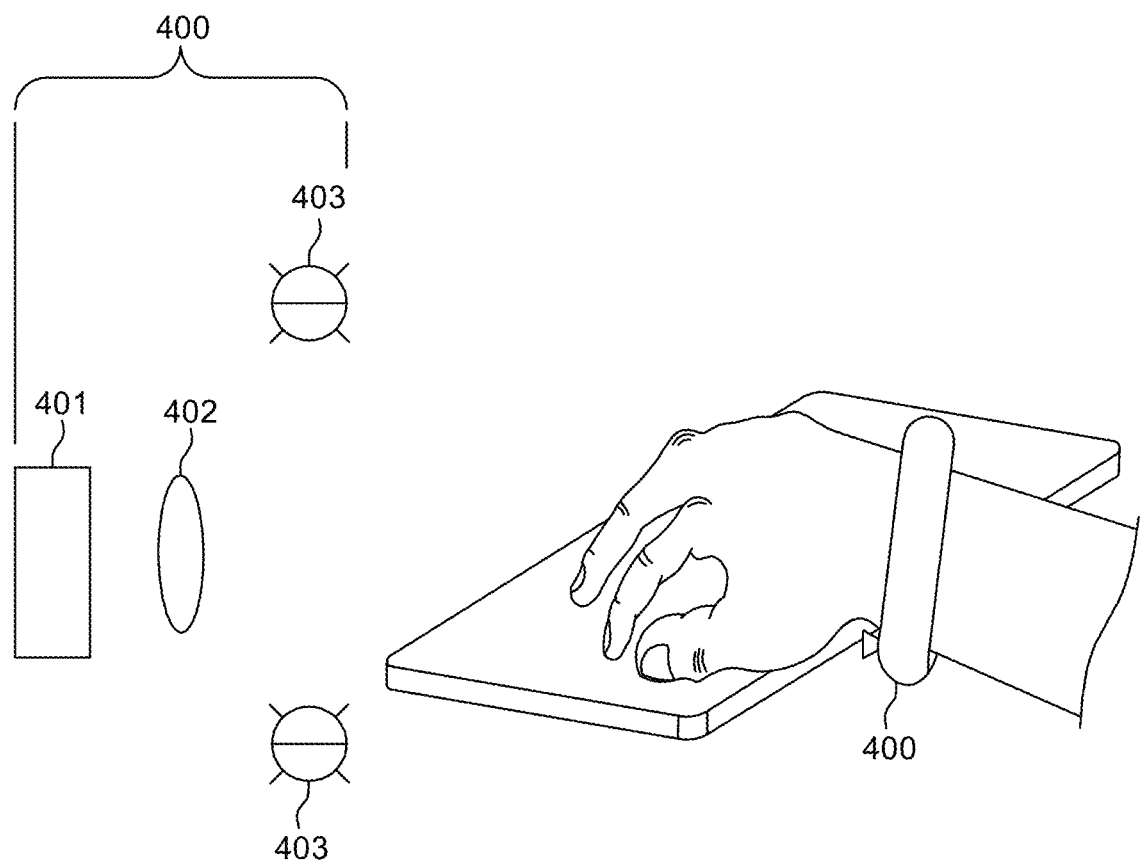
FIG. 4 illustrates another example of a camera-based sensor apparatus.

Referring to FIG. 4, in another embodiment, the optical illumination system can operate in the visible light spectrum (e.g., 400-700 nm). This embodiment is similar to the above described IR embodiments; however the illumination system emits light in the visible spectrum instead of the infrared spectrum. FIG. 4 illustrates an example camera-based sensor apparatus 400, or special purposed camera, which, in some example embodiments may further represent the sensor apparatus 201 that is described above in connection with FIG. 2. In this embodiment, the sensor apparatus 400 includes an image sensor 401 which is sensitive to light in the visible spectrum, with associated drive electronics and image processing means (not shown), and a wide angle lens 402 arranged such that all five fingers will be in its field of view. Sensor apparatus 400 can also include an optical illumination system. The illumination system includes one or more visible light-emitting diodes (LEDs) 403 which are strobed. In one embodiment, LEDs 403 are strobed in synchronization with the image 401. In another embodiment, LEDs 403 are strobed when a tap is detected.

In this example implementation, as shown in FIG. 4, sensor apparatus 400 is implemented by attaching at least the sensor apparatus 400 to the bottom of a wrist of a user, arranged in a manner such that all of the fingertips of the user are within its field of view. As noted above in connection with FIG. 2, sensor apparatus 400 also can be implemented at other locations, such as by way of the sensor apparatus 301 (or special purposed camera) located at the bottom of a palm of a user.

Alternatively, the illumination system is optional and the special purposed camera may utilize ambient light to acquire the image. In this embodiment, visible light emitting diodes 403 are thus not incorporated in sensor apparatus 400. Optionally, the illumination system can still be included (e.g., by including visible light emitting diodes 403) but the visible light diodes 403 can be left turned off when the ambient light is sufficient to acquire the image of the finger combination. In this optional embodiment, image sensor 401 can be used to sense the ambient light level and processor 202 (FIG. 2) can be used to determine whether there is sufficient light and to control visible light-emitting diodes 403 by strobing them when necessary.

In yet another embodiment, the sensor apparatus can be a stereoscopic camera. This embodiment is similar to the embodiments discussed above in connection with FIGS. 2-4, except that the sensor apparatus consists of two image sensors and two lenses, disposed relatively close to one another. When a tap is sensed, both image sensors simultaneously acquire images of the fingers at slightly different perspectives. In this embodiment the images captured by the image sensors are processed to determine landmarks in the two images to produce a single pseudo-three-dimensional image. This compound image is then further analyzed to determine which finger combination has been tapped as in the above embodiments.

Alternatively, the special purpose camera discussed above in connection with FIGS. 2-4 can be a time-of-flight type camera. In this embodiment, a single image sensor is used. In addition to capturing a two-dimensional image, the sensor apparatus (or special purpose camera) also records three-dimensional depth information. This compound image is further processed to determine which finger combination has been tapped.

In some example embodiments, one or more hardware components (e.g., components 201, 202, and/or 203 (FIG. 3), and/or components 301, 302, 303, 304 or 305 (FIG. 3) or 401, 402 and/or 403 (FIG. 4)) can be incorporated into another computing device. For instance, the components may be integrated into a smart watch, wearable glasses, another type of wearable device, or the like.

Alternatively, the components may be integrated into a desktop computer, laptop computer, tablet computer, or computer screen in which case the sensor apparatus can be, for example, of a form similar to that of the sensor apparatus 300 or 400 described above, but with at least the sensor apparatus and processor (e.g., processor 202) being housed in a device that is not worn by the user (e.g., a desktop, laptop, or tablet computer).

In yet another example embodiment, the sensing apparatus (e.g., component 201, 300, and/or 400) and processor (e.g., component 202) are not worn on the body of the user, but instead are remote from the user. For example, in a classroom or office, the sensor apparatus and processor may be installed in a centralized fixture, and tap data may be communicated by a transmitter (e.g., transmitter 203) in the centralized fixture to respective computing devices being operated by multiple users in the room. One example embodiment of such a system employs a stereoscopic camera and an IR illumination system, such as a scanning IR laser, that work together to capture images and determine the movements of users throughout the room.

Feature extraction software is then employed to identify within the field of view each user and their respective hand and finger locations. For example, after a user activates their respective computing device, the camera or imaging system of the centralized fixture identifies the finger positions of the user. Accuracy of the sensed finger positions can be enhanced by utilizing the IR illumination system. The fixture acquires the finger positions using the IR laser, and acquires images of each finger as it is illuminated by the laser. The processor of the fixture determines as each tap is performed whether each of the involved fingers is in contact with the surface when the tap is sensed, and then uses a mapping (e.g., as described in further detail below) to determine which character or command was input. A transmitter (e.g., component 203) of the fixture then transmits to the computing device of the associated user a message representing the appropriate character.

Figure 5:
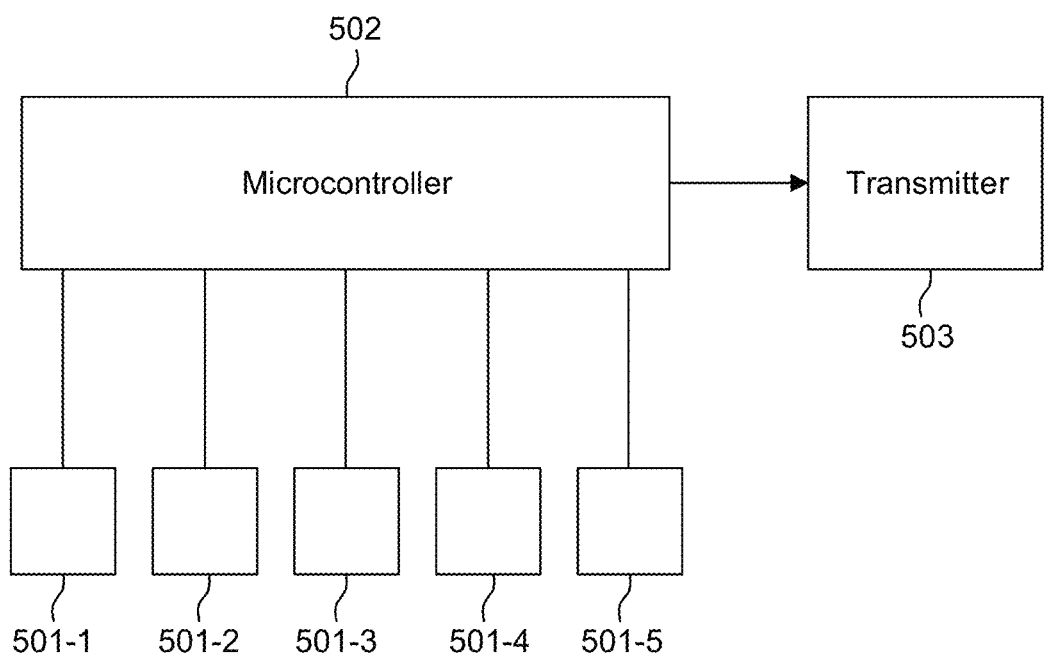
FIG. 5 illustrates another system that may be employed in accordance with example embodiments herein.

FIG. 5 illustrates another example system 500 that may be employed in accordance with example embodiments herein. This example embodiment employs mechanical sensors 501-1, 501-2, 501-3, 501-4, and 501-5 (collectively, 501), such as accelerometers, vibration sensors, tactile sensors, force sensors, pressure sensors, gyroscopes, and the like, to sense the mechanical quantities associated with corresponding fingers such as acceleration, vibration, force, pressure and the like. When, for example, a sudden change in mechanical quantity such as acceleration, vibration, force, pressure and the like, is sensed by any one or more of the sensors 501, a microcontroller 502 reads the output of the respective sensor(s) 501 and processes this information.

It should be understood that microcontroller 502 can include a processor such as the processor 202 discussed above with respect to FIG. 2. In addition, instead of using a microcontroller having input ports (e.g., analog-to-digital inputs ports), a processor in conjunction with similar peripheral integrated circuitry can be used (e.g., an analog-to-digital integrated circuit) and still be within the scope of the invention. Similarly, processor 202 discussed above in connection with FIG. 2 can be replaced with a microcontroller and still be within the scope of the invention.

In this embodiment, the sensors 501 are worn in such a way that each sensor 501 is in contact with a respective finger of a hand.

In this example embodiment, system 500 monitors the outputs of sensor 501. The beginning of a tap event, in this situation, is indicated by a change in output from any of the sensors 501 above a pre-determined threshold.

Once a tap event is sensed, microcontroller 502 reads data corresponding to each of the sensors 501 for a predetermined period of time (e.g. 60 ms), and analyzes the data to determine which of the fingers associated with the sensors 501 has made contact with a surface (resulting in a sensed finger combination). The microcontroller 502 then selects the character associated with the sensed finger combination and causes a transmitter 503 to transmit the character to a computing device.

In an example embodiment, microcontroller 502 sends the raw data from the sensors to a smartphone or other computing device, and the procedure of analyzing the raw data to determine which finger combination has been tapped may be performed within the smartphone or computing device.

Alternatively, the processor 502 extracts certain features from the raw data, such as peak amplitude, pulse width, rise time, time of arrival or (in the frequency domain) the power density for each of the sensors 501. Such feature information may be transmitted to a smartphone or other device with computing means. Further analysis of these features would then be performed within the smartphone or other computing means to determine the finger tap combination.

Figure 6:
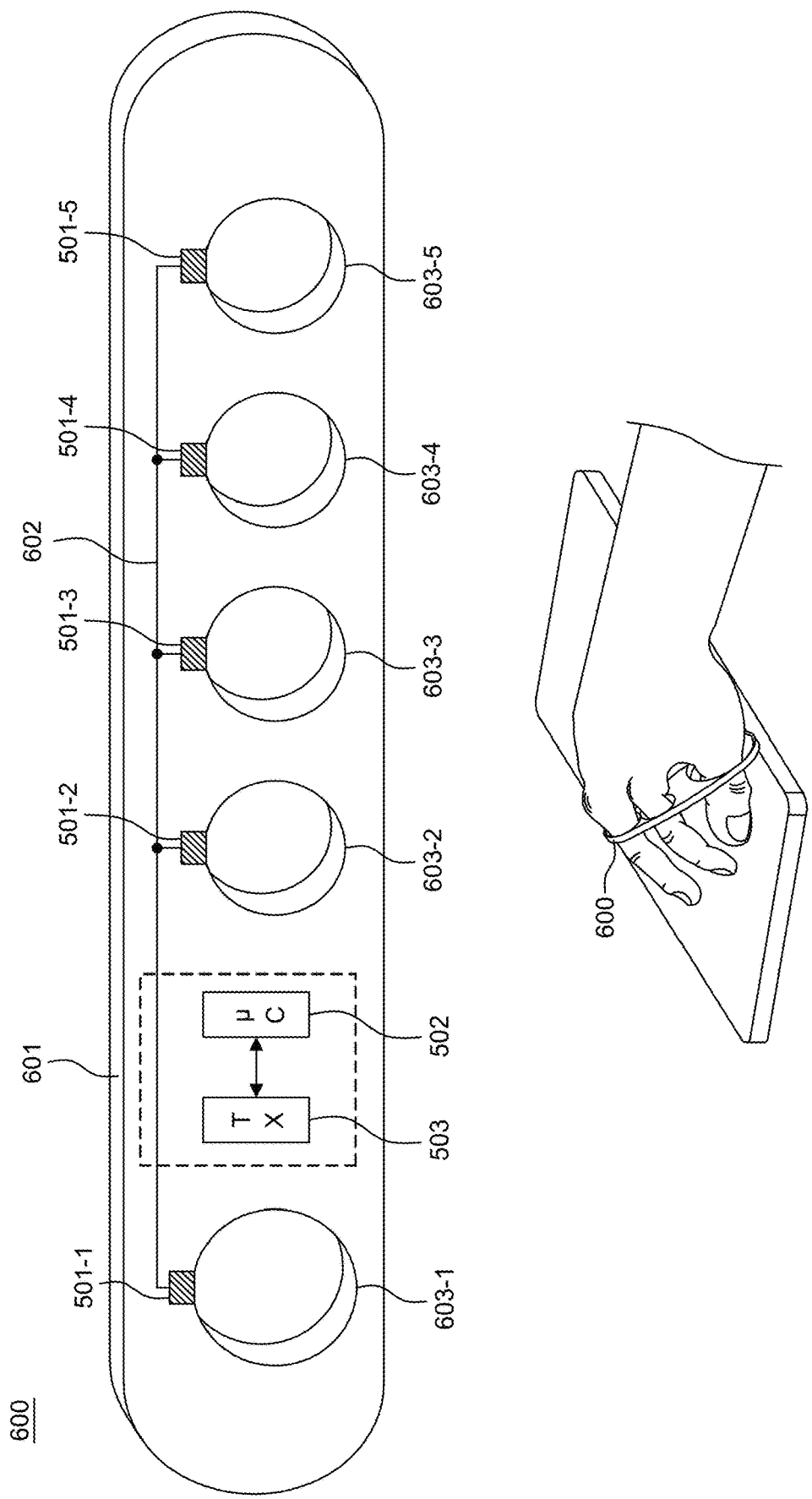
FIG. 6 illustrates an example mechanical sensor apparatus.

FIG. 6 illustrates an example sensor apparatus 600, which may further represent the sensor apparatus 500 that is described above in connection with FIG. 5. As shown in FIG. 6, mechanical sensors 501 (e.g., such as accelerometers, vibration sensors, tactile sensors, force sensors, pressure sensors, gyroscopes, and the like) are integrated inside the sensor apparatus 600, which in this example embodiment is in the form of a finger separator 601 that is flexible. The sensors 501 are located in the sensor apparatus 600 such that each sensor 501-1, 501-2, 501-3, 501-4, 501-5 is substantially in contact with a respective finger that is inserted within each finger hole 603-1, 603-2, 603-3, 603-4, 603-5 of finger separator 601 along the proximal phalanges (e.g., one sensor per proximal phalanx). Optionally, the sensor apparatus 600 can be constructed so as to house processor 502 and/or transmitter 503 as well, as shown in FIG. 6. Other components (e.g., power circuitry) can be integrated within the sensor apparatus 600 as well. The sensors 501 can be connected to the processor 502 via a bus placed within the structure of the finger separator 601. Alternatively, just the sensors 501 can be housed within the sensor apparatus 600 and connected via a connector (not shown) to the processor 502 and transmitter 503.

In yet another embodiment, just the sensors 501 and processor 502 can be housed (or encased) within the sensor apparatus 600 and connected to a remote transmitter 503 through a connector (not shown). It should be understood that the sensors 501 can be incorporated into a form factor other than the finger separator form factor shown in FIG. 6 and still be within the scope of the invention. Indeed, the form factor can be tailored to different ergonomics for different sizes and shapes of fingers and/or hands as will now be described.

This could be accomplished by incorporating the sensors 501 into a glove (or fingerless glove), so that each sensor 501 is in contact with one of the fingers along the phalanges. Alternatively, the sensors 501 could be worn across the back of the palm, so that the sensors 501 are in contact with the fingers along the metacarpal bones of each finger.

System 500 can be integrated into a variety of wearable structures. In another example embodiment, one or more system 500 components, for example, mechanical sensors 501, are incorporated into a flexible piece of fabric, such as a wearable wristband which can further be wrapped around the fingers or palm (fiducial marks), and operate in manners similar to those described in the context of the various example embodiments described elsewhere herein. The fabric may be comprised of elastic or another flexible material, in which the circuitry of the system 500 components is incorporated using flexible circuit technology. The fabric may be worn by the user by being wrapped around the user's hand, wrist, or other body part, which the user may move to cause particular characters to be transmitted or inputted to a computing device. In this embodiment, several mechanical sensors can be arranged within the layers of the material such that one or more mechanical sensors measures a mechanical quantity associated with a corresponding finger when the finger is tapped against a surface.

In another embodiment, the sensor apparatus 501 may be one or more acoustic sensors each of which senses the sound waves produced when each finger contacts the surface. In such a configuration, a single sensor or a multiplicity of sensors can be arranged to sense the acoustic signals produced by each tap. The processing means analyzes these signals to determine which of the fingers contributed to the acoustic signal in order to determine which finger combination was tapped.

In another embodiment, one or more EMG (electromyography) sensors may be employed. In this embodiment, sensors are in contact with the hand, wrist or arm of the user, and sense the electrical signals which are produced by the movement of the fingers and hand. Such a device may also employ a vibration sensor or accelerometer to sense a tap event. When a tap occurs the processor analyzes the signals from the EMG sensors to calculate the relative position of the fingers in order to determine which tap combination has been produced.

In another embodiment, Radio Frequency waves may be employed to determine the relative location of the fingers. In this embodiment, one or more RF sources produce a brief signal, and a multiplicity of sensors measures the pattern of reflection of such signal. By analyzing the reflection pattern, the location of the fingers is calculated and the tap combination is determined.

In another embodiment, processor 202 (FIG. 2) can be used instead of microcontroller 502 or conversely microcontroller 502 can be used instead of processor 202. Additionally, both systems 200 and 500 and their respective implementations can be combined. In this embodiment, placement of the camera-based sensor apparatus 201 and mechanical sensors 501 can be arranged as described herein.

Figure 7:
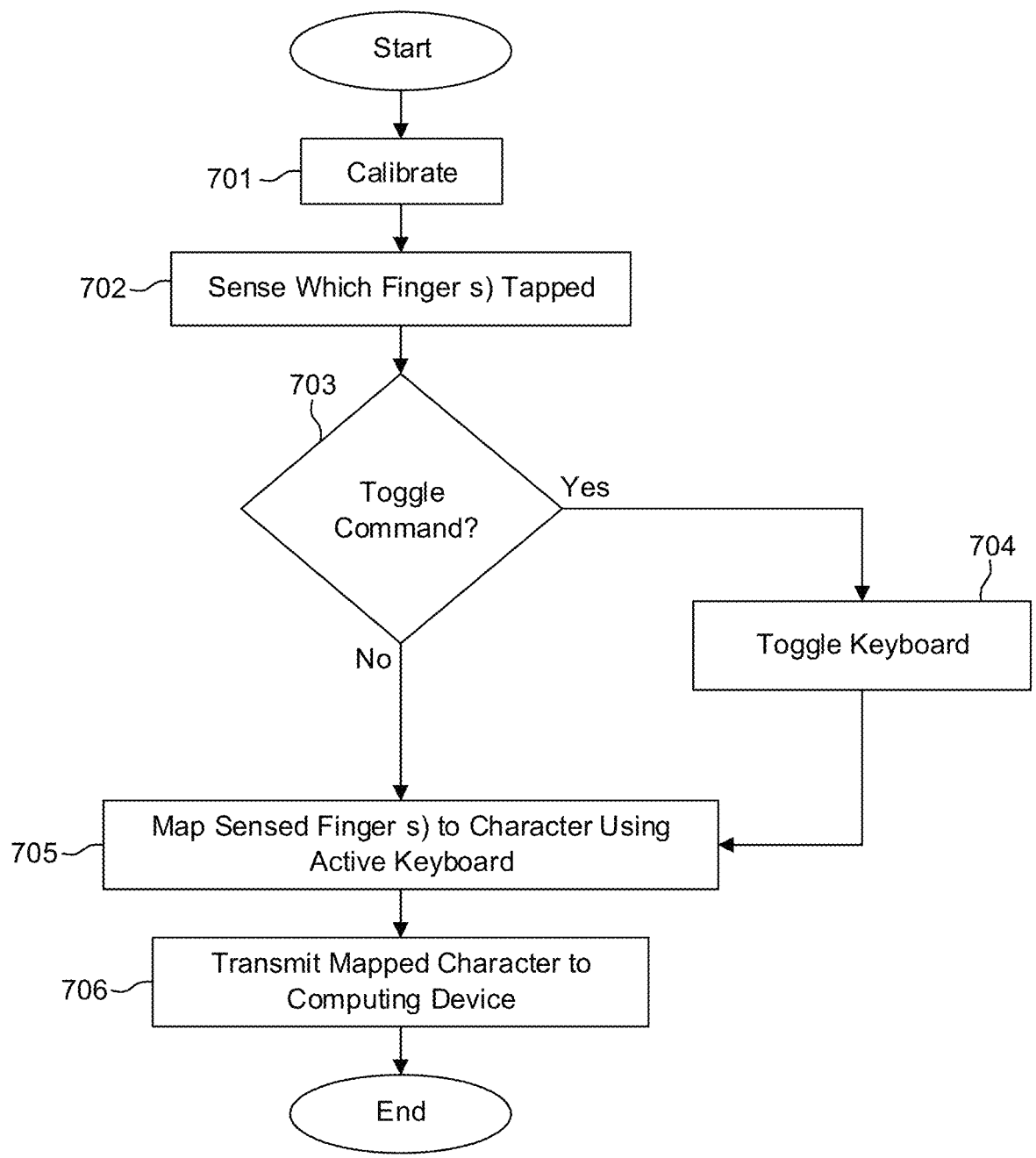
FIG. 7 is a flowchart illustrating an example procedure that may be employed according to various example embodiments herein.

Having described example systems that may be employed in accordance with various example aspects herein, reference will now be made to FIG. 7 to describe an example procedure 700 that may employ such systems.

At block 701, an optional calibration procedure is employed in order to speed and simplify processing, and to make the detection process more robust. To do this, a reference signal is first generated by tapping all of the fingers of a hand on a surface, enabling capture and processing of a corresponding reference signal. Since it is known that the reference tap is performed with all fingers in contact with the surface, the calibrated signal would serve as a reference signal that represents the signal produced by the sensor in a situation in which each of the fingers is in contact with the surface. The device can employ the reference signal as the basis for interpreting future taps, for instance by determining whether any given fingertip is present in any of the reference "down" positions.

The image sensor apparatus system 200 discussed above in connection with FIGS. 2-4 can be employed to acquire a reference signal. In instances where the sensor apparatus is as discussed above, the reference signal is an image which presents the position of each of the fingers when they are in the 'tap' position. This reference image can be compared to subsequently acquired images to determine which fingers are shown to be in the 'tap' position or the 'no tap' position.

The mechanical sensor apparatus system 500 discussed above in connection with FIGS. 5 and 6 can also be employed in a manner to acquire a reference signal. In such an embodiment, the signals acquired from the sensors from the reference 'tap' are analyzed and features are extracted from the sensors 501 of each finger which represent the signals produced when each of the fingers contacts the surface. This information can be compared with subsequent signals from subsequent tap events to distinguish which fingers have contacted the surface and which have not.

At block 702, a tap is sensed and a determination is made as to which finger combination was employed during the tap. In the camera implementation, when the tap occurs, an image (or sequence of images) of the fingers is acquired and stored in a memory. In the mechanical sensor embodiment, the forces of each mechanical sensor measurement is acquired and stored in a memory. A processor (e.g., processor 202 or 502) then executes a series of filter algorithms on the acquired images to ascertain the locations of the fingertips during the tap. For example, the processor may first execute an edge detection algorithm, such as a Canny Filter, on the acquired image. The result of such a procedure may include a table of pixel locations of the lowest part of each fingertip within the image.

At block 703 a determination is made (e.g., by processor 202 or 502) based on the sensed finger combination and the mapping provided by the presently active keyboard, whether the sensed finger combination corresponds to a toggle command. If the processor determines that the sensed finger combination does not correspond to the toggle command, then control is passed to block 705. If, on the other hand, a determination is made in block 703 that the sensed finger combination does correspond to the toggle command, then at block 704 the processor toggles the keyboard, activating either the default keyboard or the alternate keyboard based on which one of the keyboards is presently active. Control is then passed to block 705.

Once a determination has been made as to which fingers were in contact with the surface during the tap, the character corresponding to that finger combination is calculated based on a look-up table. In particular, at block 705, the mapping provided by the active keyboard (e.g., the default keyboard or the alternate keyboard, as shown for example in Table 1 (below), which in some example embodiments is pre-stored in memory) is employed to map the sensed finger combination to a corresponding character (a mapped or decoded character).

At block 706, the processor causes the transmitter to transmit the mapped or decoded character to the computing device (e.g., a mobile or desktop computing device) by way of a wired or wireless interface. At that point, the system can optionally return to the low-power mode until a next tap event is detected.

Figure 8:
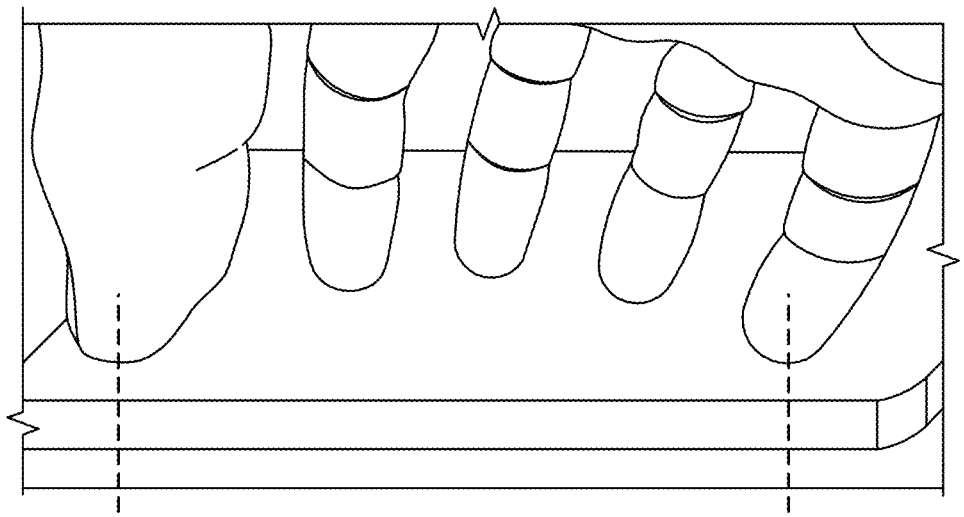
FIG. 8 illustrates an example of an acquired image and a corresponding edge-detected image in accordance with various example aspects herein.
Figure 8:
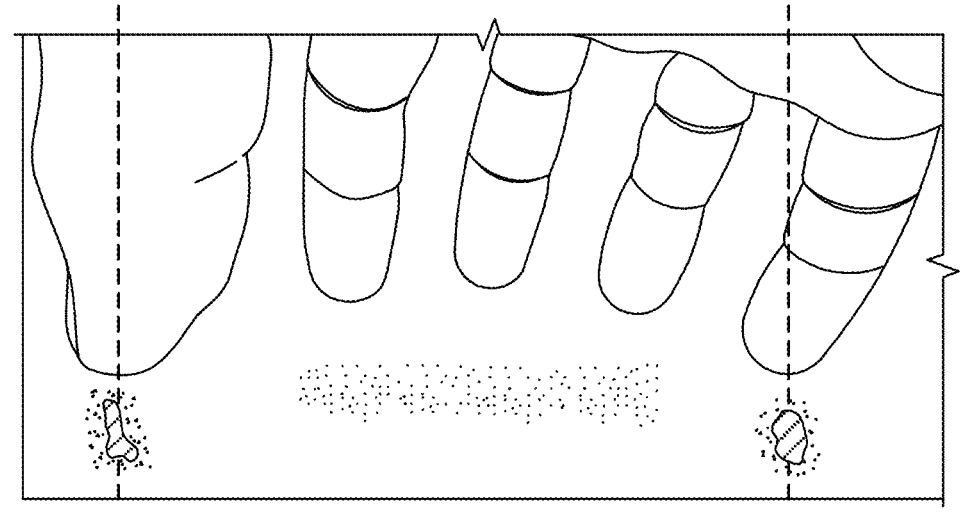

FIG. 8 illustrates an example acquired image 801 and a corresponding edge-detected image 802 that may result from executing the above-described procedure. The processor applies a feature extraction algorithm, such as a Hough Transform, to the edge-detected image in order to identify the finger combination of the tap. The fingertips, in one example, are modeled as simple circles (or semi-circles) for the Hough Transform. In this manner, the feature extraction process is simplified because of the a priori knowledge of the morphology of the hand, i.e., that there are five fingers, and that the fingers are arranged vertically throughout the image.

Using the five fingers of one hand, a user can tap 31 unique finger combinations. These finger combinations are mapped to standard ASCII characters. For example, in the English language, the 31 finger combinations would suffice to represent the 26 letters of the alphabet, and the five remaining combinations could be used to represent common "control" characters, such as SHIFT, RETURN, and BACK-SPACE. As described below, one of the finger combinations would represent a "toggle" command, which would enable an alternate character set or sets. These alternate character sets can contain additional characters such as numbers, punctuation and other ASCII characters.

As described above, the processor need not determine which of the fingertips were in contact with the surface (i.e., perform the algorithm that maps the finger combinations to standard ASCII characters) and instead can cause the raw data to be transmitted to a computing device that is communicatively coupled with the processor (e.g., processor 202 or 502) through, for example, a transmitter (e.g., 203 or 503). This would allow for example for the processing device of the computing device (e.g., in a smartphone or other computing device) to determine which of the fingertips were in contact with a surface during the tap, and which were not.

Table 1 shows an example of how the printable ASCII characters and common control characters could be mapped into finger tap combinations. In particular, Table 1 shows which default keyboard character and which alternate keyboard character corresponds to each finger combination. Finger combinations are identified in the chart by a string of five characters corresponding to the five fingers, respectively, of a user's hand. For instance, the left-most one of the five characters may correspond to a user's thumb on their right hand or the user's pinky on their left hand, and so on. The right-most one of the five characters may correspond to a user's pinky on their right hand or their thumb on their left hand, and so on. In each finger combination an X represents a finger that is involved in a tap, and an O represents a finger that is not involved in the tap, thereby forming a binary number that can be mapped to different characters.

TABLE 1

CHARACTER MAP EXAMPLE

| FINGER COMBO. | DEFAULT KEYBOARD | | ALTERNATE KEYBOARD | |
| --- | --- | --- | --- | --- |
| | No Shift | Shift | No Shift | Shift |
| 1  XOOOO | A | A | 1 | |
| 2  OXOOO | E | E | 2 | |
| 3  XXOOO | N | N | 6 | |
| 4  OOXOO | I | L | 3 | |
| 5  XOXOO | S | S | ? | |
| 6  OXXOO | T | T | 7 | |
| 7  XXXOO | SHIFT | SHIFT | SHIFT | |
| 8  OOOXO | O | O | 4 | |
| 9  XOOXO | K | K | , | |
| 10  OXOXO | M | M | ( | ) |
| 11  XXOXO | J | J | - | _ |
| 12  OOXXO | L | L | 8 | |
| 13  XOXXO | X | X | / | \ |
| 14  OXXXO | DELETE | DELETE | DELETE | |
| 15  XXXXO | R | R | . | |
| 16  OOOOX | U | U | 5 | |
| 17  XOOOX | Y | Y | ' | " |
| 18  OXOOX | G | G | : | |
| 19  XXOOX | B | B | ! | |
| 20  OOXOX | F | F | < | > |
| 21  XOXOX | W | W | # | * |
| 22  OXXOX | Q | Q | + | = |
| 23  XXXOX | Z | Z | ^ | ~ |
| 24  OOOXX | d | D | 9 | |
| 25  XOOXX | C | C | $ | % |
| 26  OXOXX | P | P | @ | & |
| 27  XXOXX | V | V | [ | ] |
| 28  OOXXX | TOGGLE | TOGGLE | TOGGLE | |
| 29  XOXXX | RETURN | RETURN | RETURN | |
| 30  OXXXX | H | H | 0 | |
| 31  XXXXX | SPACE | SPACE | SPACE | |

For convenience, the following example is provided in a case where a user's right hand is being employed for taps. At the start, a default keyboard (or character set) is active. As one example, to tap the letter "a," the user may momentarily tap their thumb on a surface, in which case a sensor apparatus determines that the thumb had been in contact with the surface at the moment of the tap, and the letter "a" is transmitted to the computing device. To tap a capital "A," the user would first tap with their thumb, first, and middle fingers simultaneously on a surface. This would be interpreted by the sensor apparatus and/or processor as the "SHIFT" command. Then, the user would tap the "A" as before, with their thumb.

As mentioned above, to activate an alternate keyboard, for instance to facilitate selection of a special character, the user would first tap the "TOGGLE" command, using the middle, ring and pinky fingers. This would activate the alternate keyboard. The user could then tap the finger combination that corresponds to the number or character desired. Note that by using the TOGGLE command in conjunction with other combinations, any number of alternative keyboards can be selected.

In one example embodiment herein, to increase the ease and speed by which a user can be trained to employ a particular mapping of finger combinations to characters, finger combinations can be categorized into finger sets, or categories of finger combinations that share similar characteristics. For instance, Table 2 shows example categories or finger sets.

TABLE 2

| Finger Set (Number of possible combinations) | Possible Finger Combinations | |
|---|---|---|
| All Fingers Down (1) | XXXXX | |
| One Finger Down (5) | X0000 | |
| | 0X000 | |
| | 00X00 | |
| | 000X0 | |
| | 0000X | |
| One Finger Up (5) | 0XXXX | |
| | X0XXX | |
| | XX0XX | |
| | XXX0X | |
| | XXXX0 | |
| Two Fingers, Together (4) | XX000 | |
| | 0XX00 | |
| | 00XX0 | |
| | 000XX | |
| Two Fingers, Skip One (3) | X0X00 | |
| | 0X0X0 | |
| | 00X0X | |
| Two Fingers, Far Apart (3) | X000X | |
| | X00X0 | |
| | 0X00X | |
| Three Fingers Together (3) | XXX00 | |
| | 0XXX0 | |
| | 00XXX | |
| Three Fingers, Skip Two and Two Skips (3) | X00XX | |
| | XX00X | |
| | X0X0X | |
| Three Fingers, Skip One (4) | X0XX0 | (Thumb Down, First Up) |
| | XX0X0 | (Thumb Down, Middle Down) |
| | 0X0XX | (Pinky Down, Middle Down) |
| | 0XX0X | (Pinky Down, Ring Up) |

By grouping finger combinations into sets, and then mapping a finger set to characters that share a common characteristic, a user may find it easier to learn to use the mapping for character entry. For example, there are five finger combinations possible in the set referred to as "one finger down." Those five finger combinations may be mapped to the five vowels of the English alphabet (i.e., a, e, i, o, and u), thereby making it easier for a user to employ such a mapping.

In another example, which is available to all the embodiments described herein, the sensor apparatus and/or other components are incorporated into a wearable device, and are configured to sense user motion in addition to finger taps. In response to such sensing, the wearable device may facilitate screen-navigation functions on a screen that is either incorporated into the wearable device or separate from the wearable device. In this manner, the device may utilize the sensed hand motions to control the location of a cursor on a computer screen, thus emulating the function of a mouse. In this situation, certain finger combinations can be mapped to common mouse commands (e.g. right click, left click).

The connectivity to a separate device can be according to Human Interface Device Profile (HID), which defines the protocols, procedures and features to be used by Bluetooth HID enabled devices such as keyboards, pointing devices, gaming devices and remote monitoring devices.

Alternatively, and/or additionally, the sensor apparatus within the wearable device can be configured to interpret gestures as well as taps. In this case, the device may be used to manipulate objects on a screen or send commands to a computing device.

As can be appreciated in view of the above, the example embodiments described herein provide a one-handed, chorded data entry system that enables an operator to tap a combination of fingers on a surface, thereby causing a character to be entered in an electronic device. Unlike previous systems, the system disclosed herein allows the user to tap on any surface, with the fingers arranged in any position. Also unlike previous systems, with this system neither the fingers nor the fingertips of the user need be aimed at any target. As a result, the system described herein reduces finger travel and facilitates fast and accurate data entry.

It should also be understood that the number of fingers required to map to a finger combination can be fewer than five. This embodiment would be useful, for example, in the case where a user's hand has fewer than five fingers due to, for example, an injury or disability.

The following embodiments relate to one-handed, chorded data entry systems such as those described above in connection with FIGS. 2, 5, 6, and 7, where the data entry system is worn on the phalanges of a hand. As described above, the data entry system incorporates sensors which detect finger taps. A sensor apparatus detects the sensor output and communications the detected output to a processor which decodes the taps into alphanumeric characters. A transmitter transmits the characters to a receiving device as described in any one of the embodiments described above.

Figure 9:
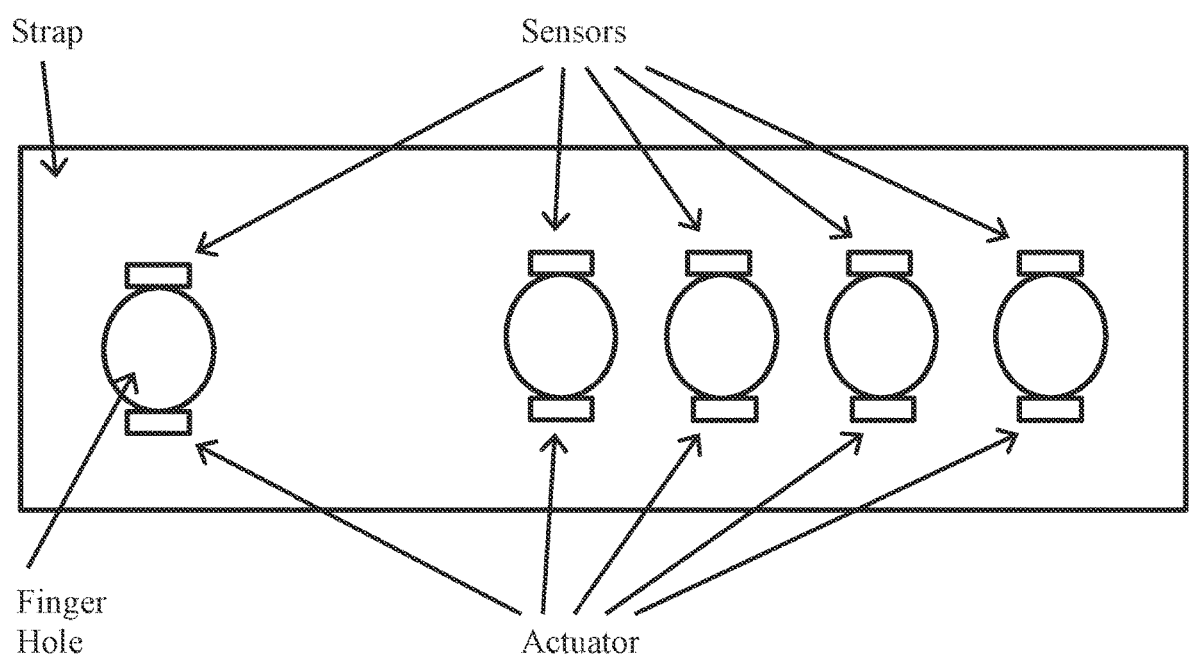
FIGS. 9 and 10 illustrate an example apparatus having both sensors and actuators in accordance with an example embodiment.
Figure 10:
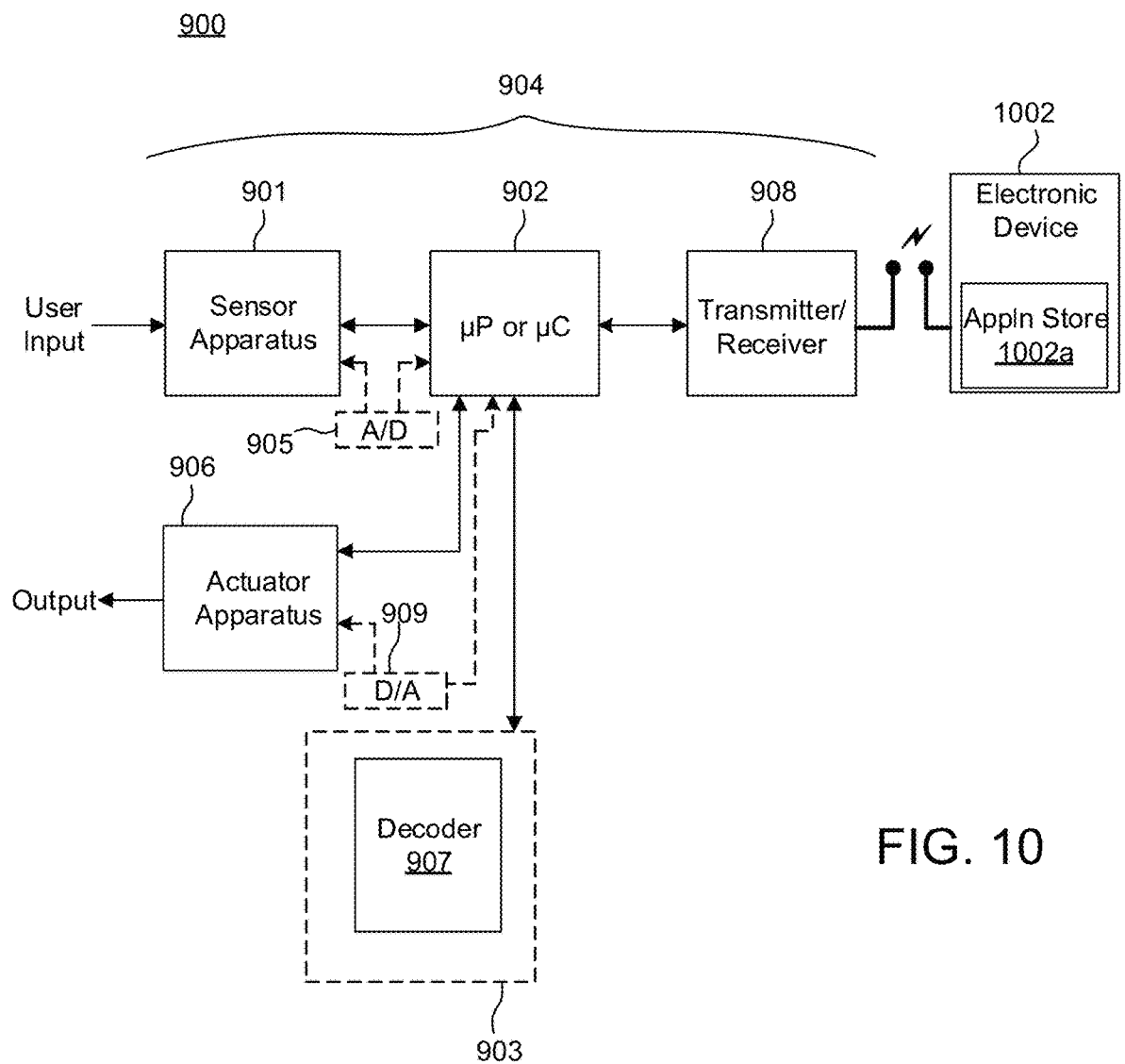
Figure 11:
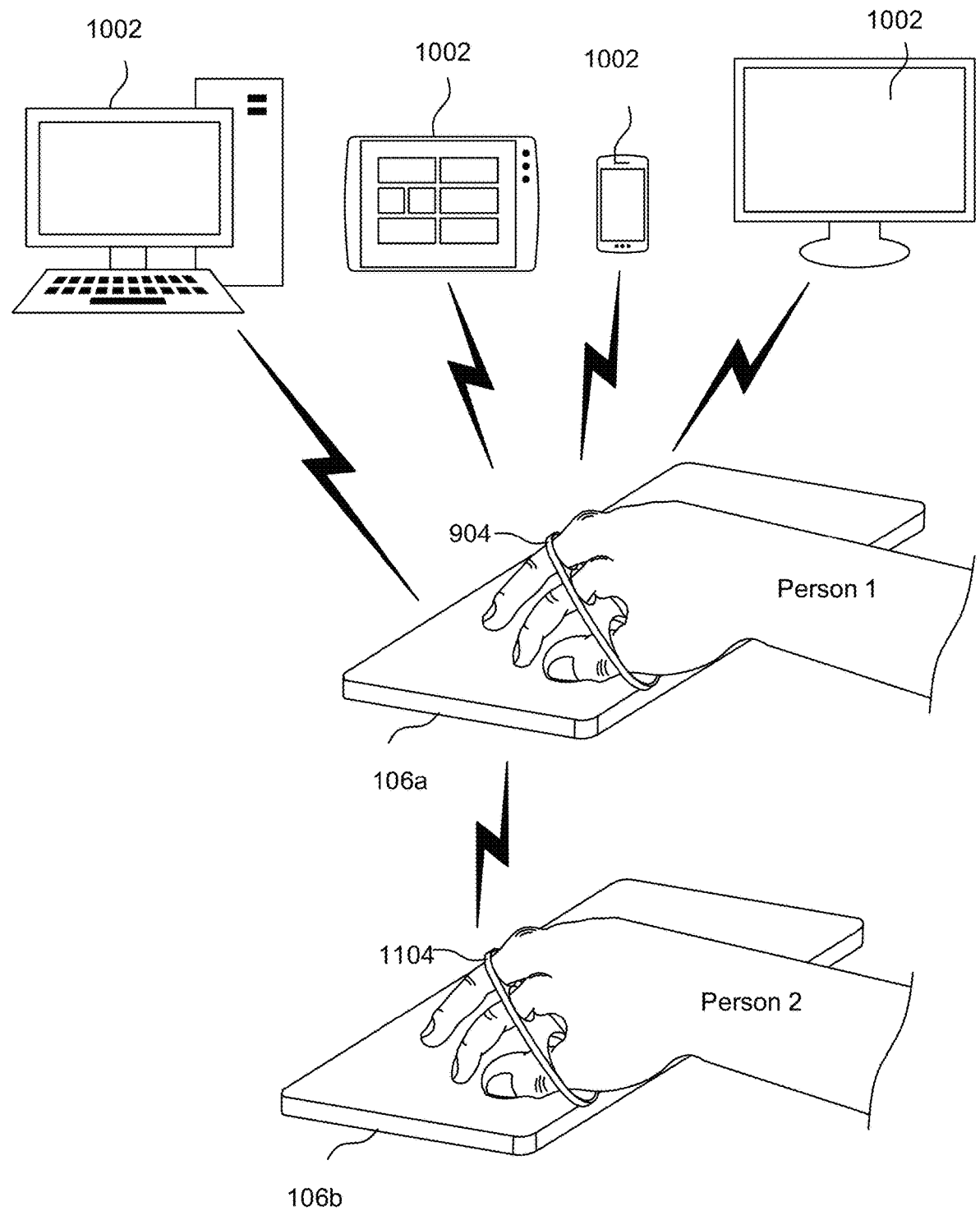
FIG. 11 illustrates example use cases in accordance with the example embodiments described herein.

As shown in FIG. 9, the system can also include plural actuators. When the device is worn by a user, each actuator is in mechanical communication with a corresponding finger. As shown in FIG. 10, the system according to this embodiment also includes a receiver 908 (optionally in the form of an independent receiver or as part of transceiver as shown) that receives alphanumeric data from, for example, a computing device 1002 or other device like 904 (e.g., 1104 worn by another person as shown in FIG. 11). Referring back to FIG. 10, the system further includes a decoder 907 that decodes the alphanumeric characters received via receiver 908 into tap codes. In an optional embodiment, the operations performed by the decoder 907 are incorporated in processor 902. The processor 902, in turn, actuates the actuators of actuator apparatus 906 according to the decoded alphanumeric character. The actuation of the actuators causes the actuators to apply a mechanical stimulus to respective fingers. In one embodiment a user selects whether to the mechanical stimulus is applied to the respective fingers simultaneously or sequentially. This mechanical stimulus mode can be controlled through a mode selector switch on the mechanical structure of the system, through a predetermined tap command, through a remote device application, and the like.

If necessary, the processor 902 can be configured to actuate intermediary circuitry (e.g., current or voltage amplifiers, or other signal conditioning components, such as D/A 909), that is necessary to drive the actuators of actuator apparatus 906. Each time alphanumeric data representing one or more characters is received via the receiver 908, the processor 902 decodes the alphanumeric data and activates the actuators which are associated with that character, which in turn, cause the actuators to press against or otherwise make contact with the fingers correspondingly so that the character(s) is/are sensed through the fingers (e.g., phalanges).

Using this device, a person can communicate with, for example, another device 1104 operated by a person (e.g., person 2) as shown in FIG. 11, or computing device 1002 executing, for example, interactive applications stored in an application store 1002*a* (FIG. 10) such as game applications, news applications, email applications, and the like) at a distance by tapping their fingers, and receive information through the mechanical communication received from the actuators. This communication can be in real-time, in which a tap from one user is transmitted and sensed by another tap device having a receiver as described above with relatively little (i.e., unperceivable) delay. Alternatively (or optionally) the tap device can be placed in an offline mode, in which alphanumeric characters that are tapped into the device 904 are composed (i.e., sensed), stored in a memory (e.g., communicatively coupled to the processor; not shown) and sent to be decoded by a receiving device having actuators as described above at a later time.

In one embodiment, the tap device is housed in a flexible substrate such as a soft, compressible foam or a fabric. The sensors consist of 3-axis accelerometers which are coupled to the fingers via rigid weights. The actuators consist of linear actuators such as micro-solenoids or piezo-electric linear actuators each of which generate a mechanical pulse when activated. The mechanical pulse is sensed by a corresponding finger. In an optional embodiment, the actuators consist of low level neuromuscular stimulation devices that produce electric pulses that can be sensed by the fingers, instead of mechanical actuators.

Software embodiments of the example embodiments presented herein may be provided as a computer program product, or software, that may include an article of manufacture on a machine accessible or machine readable medium having instructions. The instructions on the non-transitory machine accessible machine readable or computer-readable medium may be used to program a computer system or other electronic device. The machine or computer-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "computer-readable", "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further includes software for performing example aspects of the invention, as described above.

Included in the programming and/or software of the general and/or special purpose computer or microprocessor are software modules for implementing the procedures described above.

While various example embodiments have been described above, it should be understood that they have been presented by way of example, and not limitation. It is apparent to persons skilled in the relevant art(s) that various changes in form and detail can be made therein. Thus, the invention should not be limited by any of the above described example embodiments. Also, as used herein, the singular forms "a," "an," and "the," are intended to include the plural forms as well, unless the context clearly indicates otherwise.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures described herein need not be performed in the order presented.

What is claimed is:

1. A data receiving system, comprising:
   a plurality of actuators configured to be in mechanical communication with a respective plurality of fingers, each of the plurality of actuators arranged to apply a single pulse to a corresponding respective one of the plurality of fingers;
   a receiver operable to receive data representing one or more alphanumeric items;
   a decoder operable to decode the received data corresponding to each alphanumeric item into a tap code from among a set of tap codes, wherein each tap code in the set of tap codes represents a unique predetermined combination of one or more fingers that corresponds to a particular alphanumeric item, wherein at least one tap code in the set of tap codes represents a combination of more than one finger, and wherein each tap code in the set of tap codes represents a combination of five or fewer fingers; and a processor that controls the actuators to apply, for each tap code from the decoder, a single pulse to each of the one or more of the plurality of fingers that correspond to the tap code, wherein the processor is configured to control the actuators to apply a single pulse to each of the one or more of the plurality of fingers that correspond to a tap code simultaneously.

2. The data receiving system according to claim 1, wherein each alphanumeric item corresponds to one of an alphanumeric character, a word, a phrase, and a sentence.

3. The data receiving system according to claim 1, further comprising:
a wearable structure constructed to support the plurality of actuators on a respective plurality of phalanges of a hand.

4. The data receiving system according to claim 1, wherein the actuators apply one of a mechanical pulse and an electrical pulse.

5. A data receiving method for a system having a plurality of actuators in mechanical communication with a respective plurality of fingers, each of the plurality of actuators being arranged to apply a single pulse to a corresponding respective finger, comprising:
receiving data representing one or more alphanumeric items;
decoding the received data corresponding to each alphanumeric item into a tap code from among a set of tap codes, wherein each tap code in the set of tap codes represents a unique predetermined combination of one or more fingers that corresponds to a particular alphanumeric item, wherein at least one tap code in the set of tap codes represents a combination of more than one finger, and wherein each tap code in the set of tap codes represents a combination of five or fewer fingers; and
controlling the actuators to apply, for each tap code from the decoder, a single pulse to each of the one or more of the plurality of fingers that correspond to the tap code,
wherein the controlling controls the actuators to apply a single pulse to each of the one or more of the plurality of fingers that correspond to a tap code simultaneously.

6. The data receiving method according to claim 5, wherein each alphanumeric item corresponds to one of an alphanumeric character, a word, a phrase, and a sentence.

7. The data receiving method according to claim 5, further comprising the step of:
supporting the plurality of actuators on a respective plurality of phalanges of a hand using a wearable structure.

8. The data receiving method according to claim 5, wherein the actuators apply one of a mechanical pulse and an electrical pulse.

9. A data entry system comprising:
a processor;
a plurality of mechanical sensors arranged to generate signals representing contact of one or more fingers of a hand singly or in simultaneous combination against an arbitrary surface; and
a plurality of actuators, each in mechanical communication with a respective one of the plurality of fingers, each of the plurality of actuators arranged to apply a single pulse to a corresponding respective one of the plurality of fingers;

wherein the processor is configured to
detect, based on the signal generated by at least one of the mechanical sensors, contact by at least one finger with an arbitrary surface,
determine a tap code, based on the signals generated by the plurality of mechanical sensors during a predetermined period of time indicating which of the one or more fingers contacted the arbitrary surface, wherein the tap code represents a unique predetermined combination of one or more fingers that corresponds to one of a character, a command, and a combination of a character and a command,
map the determined tap code to the corresponding one of a character, a command, and a combination of a character and a command, and
transmit the mapped character, command or combination to an external device, and
wherein the processor is further configured to
receive data from the external device,
decode the received data to generate a tap code, and
perform control of the plurality of actuators to apply, for the generated tap code, a single pulse to each of the one or more of the plurality of fingers that correspond to the generated tap code simultaneously.

10. A data communication method for a system having a plurality of mechanical sensors arranged to generate signals representing contact of one or more fingers of a hand singly or in simultaneous combination against an arbitrary surface, and a plurality of actuators each in mechanical communication with a respective one of the plurality of fingers, each of the plurality of actuators arranged to apply a single pulse to a corresponding respective one of the plurality of fingers, the method comprising:
detecting, based on the signal generated by at least one of the mechanical sensors, contact by at least one finger with an arbitrary surface;
determining a tap code, based on the signals generated by the plurality of mechanical sensors during a predetermined period of time indicating which of the one or more fingers contacted the arbitrary surface, wherein the tap code represents a unique predetermined combination of one or more fingers that corresponds to one of a character, a command, and a combination of a character and a command;
mapping the determined tap code to the corresponding one of a character, a command, and a combination of a character and a command;
transmitting the mapped character, command, or combination to an external device;
receiving data from the external device;
decoding the received data to generate a tap code; and
performing control to apply, for the generated tap code, a single pulse to each of the one or more of the plurality of fingers that correspond to the generated tap code simultaneously.

11. A data receiving system comprising:
a plurality of actuators configured to be in mechanical communication with a respective plurality of fingers, each of the plurality of actuators arranged to apply a single pulse to a corresponding respective one of the plurality of fingers;
a receiver operable to receive data representing one or more alphanumeric items;
a decoder operable to decode the received data corresponding to each alphanumeric item into a tap code from among a set of tap codes, wherein each tap code in the set of tap codes represents a unique predetermined combination of one or more fingers that corresponds to a particular alphanumeric item, wherein at least one tap code in the set of tap codes represents a combination of more than one finger, and wherein each tap code in the set of tap codes represents a combination of five or fewer fingers; and a processor that controls the actuators to apply, for each tap code from the decoder, a single pulse to each of the one or more of the plurality of fingers that correspond to the tap code, wherein the processor is configured to set a setting that indicates whether pulses should be applied simultaneously or sequentially, and wherein the processor is further configured to selectively control the actuators to apply a single pulse to each of the one or more of the plurality of fingers that correspond to a tap code simultaneously or sequentially in accordance with the setting.

12. A data receiving method for a system having a plurality of actuators in mechanical communication with a respective plurality of fingers, each of the plurality of actuators being arranged to apply a single pulse to a corresponding respective finger, comprising:

receiving data representing one or more alphanumeric items;

decoding the received data corresponding to each alphanumeric item into a tap code from among a set of tap codes, wherein each tap code in the set of tap codes represents a unique predetermined combination of one or more fingers that corresponds to a particular alphanumeric item, wherein at least one tap code in the set of tap codes represents a combination of more than one finger, and wherein each tap code in the set of tap codes represents a combination of five or fewer fingers; and controlling the actuators to apply, for each tap code from the decoder, a single pulse to each of the one or more of the plurality of fingers that correspond to the tap code, wherein a setting indicates whether pulses should be applied simultaneously or sequentially, and wherein the controlling controls the actuators to apply a single pulse to each of the one or more of the plurality of fingers that correspond to a tap code simultaneously or sequentially in accordance with the setting.

* * * * *